United States Patent
Yu et al.

(10) Patent No.: US 9,269,280 B2
(45) Date of Patent: Feb. 23, 2016

(54) APPARATUS FOR ANALYZING GEOGRAPHIC INFORMATION AND METHOD THEREOF

(71) Applicant: Electronics and Telecommunications Research Institute, Daejeon (KR)

(72) Inventors: Yeong Woong Yu, Busan (KR); Hong Suk Hu, Daejeon (KR); Hea Won Lee, Daejeon (KR); Yong Hoon Choi, Daejeon (KR); Hoon Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 195 days.

(21) Appl. No.: 13/973,322

(22) Filed: Aug. 22, 2013

(65) Prior Publication Data

US 2014/0172896 A1 Jun. 19, 2014

(30) Foreign Application Priority Data

Dec. 14, 2012 (KR) ........................ 10-2012-0146232

(51) Int. Cl.
*G06F 17/30* (2006.01)
*G09B 29/10* (2006.01)

(52) U.S. Cl.
CPC .................... *G09B 29/106* (2013.01)

(58) Field of Classification Search
USPC .................................................. 707/706, 758
See application file for complete search history.

(56) References Cited

U.S. PATENT DOCUMENTS

| | | | | |
|---|---|---|---|---|
| 6,434,265 | B1* | 8/2002 | Xiong | G06K 9/32 382/154 |
| 6,549,651 | B2* | 4/2003 | Xiong | G06K 9/32 345/629 |
| 7,266,218 | B2* | 9/2007 | Call | G06K 9/3233 382/101 |
| 2002/0114536 | A1* | 8/2002 | Xiong | G06K 9/32 382/284 |
| 2004/0211071 | A1* | 10/2004 | Su | G06T 11/40 33/1 AP |
| 2004/0223628 | A1* | 11/2004 | Call | G06K 9/3233 382/101 |
| 2012/0220274 | A1* | 8/2012 | Nagata | G06Q 10/06 455/414.1 |
| 2012/0254226 | A1* | 10/2012 | Shaw | G06F 17/30241 707/769 |
| 2012/0317114 | A1* | 12/2012 | Sato | G06Q 30/0201 707/737 |

FOREIGN PATENT DOCUMENTS

KR 10-0885246 B1 2/2009

* cited by examiner

*Primary Examiner* — Kim Nguyen
(74) *Attorney, Agent, or Firm* — Rabin & Berdo, P.C.

(57) ABSTRACT

Disclosed are a geographic information analyzing apparatus and a method thereof, and more specifically, a geographic information analyzing apparatus which is capable of analyzing a region arbitrarily set by a user and a method thereof. The a geographic information analyzing apparatus disclosed in this specification includes a data storing unit which includes a spatial data storing unit which stores geospatial information and an attribute data storing unit which stores attribute information corresponding to the spatial data; a map viewer which provides a user interface and receives spatial information of an arbitrary region from a user, and a function providing unit which compares the geospatial information with the spatial information of the arbitrary region to calculate an overlapping ratio and performs analysis in accordance with a previously set function using attribute information in accordance with the overlapping ratio.

12 Claims, 3 Drawing Sheets

APPARATUS FOR ANALYZING GEOGRAPHIC INFORMATION AND METHOD THEREOF

CROSS-REFERENCE TO RELATED APPLICATIONS

This application claims priority to and the benefit of Korean Patent Application No. 10-2012-0146232 filed in the Korean Intellectual Property Office on Dec. 14, 2012, the entire contents of which are incorporated herein by reference.

TECHNICAL FIELD

Exemplary embodiments relate to a geographic information analyzing apparatus and a method thereof, and more specifically, to a geographic information analyzing apparatus which is capable of analyzing a region arbitrarily set by a user and a method thereof.

BACKGROUND ART

A geographic information system (GIS) is an information system which combines and processes geographic data which occupies a geospatial position and various attribute data related to the geographic data and defined as a general organization of hardware, software, geographic data, and a human resource which is used to efficiently collect, store, update, manipulate, analyze, and output various types of geographic information.

Generally, a user interface is implemented as a GIS viewer in the geographic information system. The GIS viewer serves to visually show geographic data which is represented as a form of a map layer on a screen and an attribute value of each feature which forms the map layer to the user. The feature is a geographic data element having one of basic geometry types, such as a point, a line, or a polygon, which form one map layer.

Here, the geometry is a measurement and a feature of a geographic object called as a feature such as the point, the line, and the polygon and is used to represent a spatial element for the geographic feature in the GIS field.

One map layer is formed as one table in a data storing unit and one feature corresponds to one row in the table.

In order to view information corresponding to a specific feature in the GIS viewer, the feature is selected and attribute information which is connected to the selected feature is read out from a database and then provided through the screen. For example, if a border is represented based on an administrative district, each feature having a polygon shape which forms the map layer indicates one administrative district and includes various categorical data such as a name or a code of the administrative district and various numerical data such as a population, the number of buildings, and the number of households of the administrative district. If such various attribute information is present in the database, the feature is selected so that the attribute information may be directly checked on the GIS viewer. In this case, the attribute which may be checked by the user is limited to a type of an existing feature. For example, information on a part of a first administrative district or a region obtained by combining a part of second administrative district and third one is unknown because a feature of the region is not present in database.

Extraction of an overlaying region between two features is simply calculated using a function which is provided by a spatial database system. However, if calculation and analysis by a specific analysis model are required as mentioned in the above example, a separate external analysis tool needs to be used or a complex analysis model needs to be directly implemented in the user interface. If the model is modified, a source code of the viewer needs to be directly modified.

SUMMARY OF THE INVENTION

The present embodiment has been made in an effort to provide a geographic information analyzing apparatus which is capable of desirably analyzing expansion, reduction of an arbitrary region on a geospatial environment or generation of change of various components in the region through a previously implemented analysis model, only by setting the arbitrary region which may be changed by a user and a method thereof.

An exemplary embodiment disclosed in this specification provides a geographic information analyzing apparatus, including: a data storing unit which includes a spatial data storing unit which stores geospatial information and an attribute data storing unit which stores attribute information corresponding to the spatial data, a map viewer which provides a user interface and receives spatial information of an arbitrary region from a user, and a function providing unit which compares the geospatial information with the spatial information of the arbitrary region to calculate an overlapping ratio and analyzes the attribute information and performs analysis in accordance with the previously set function through an analysis model using the attribute information in accordance with the overlapping ratio.

Another exemplary embodiment provides a geographic information analyzing method of a geographic information analyzing apparatus including a data storing unit which includes a spatial data storing unit which stores geospatial information and an attribute data storing unit which stores attribute information corresponding to the spatial data, the method including: providing a user interface and receiving spatial information of an arbitrary region from a user, and comparing the geospatial information with the spatial information of the arbitrary region to calculate an overlapping ratio and performing analysis in accordance with a previously set function using attribute information in accordance with the overlapping ratio.

According to the exemplary embodiments of the present invention, expansion, reduction of an arbitrary region on a geospatial environment and generation of change of various components in the region are analyzed only by setting the arbitrary region which may be changed by a user.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
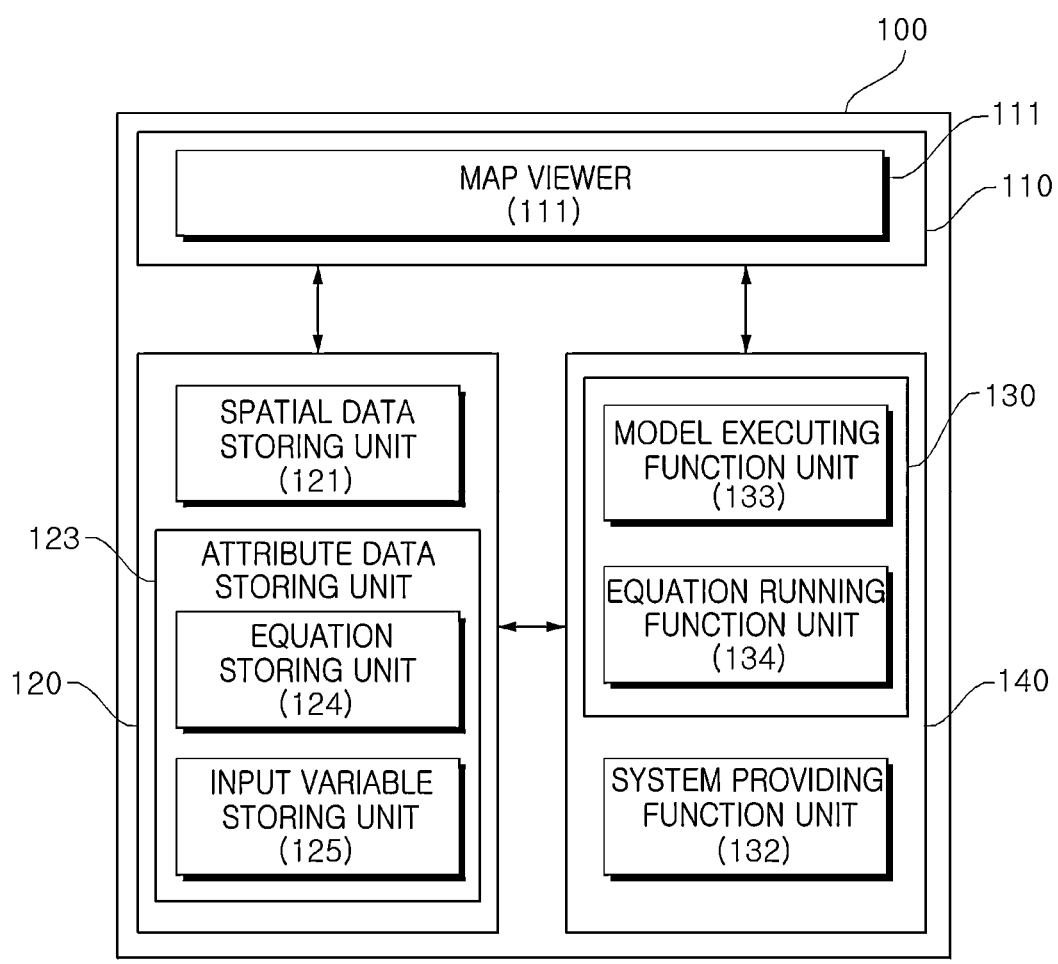
FIG. 1 is a view illustrating a geographic information analyzing apparatus according to an exemplary embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description illustrates only a principle of the present invention. Therefore, it is understood that those skilled in the art may implement the principle of the present invention and invent various apparatuses which are included in a concept and a scope of the present invention even though not clearly described or illustrated in the specification. It is further understood that all conditional terms and exemplary embodiments which are described in the specification are apparently intended to understand the concept of the invention but the present invention is not limited to the exemplary embodiments and states specifically described in the specification.

It is also understood that all detailed description which specifies not only a principle, an aspect, and an embodiment, but also a specific embodiment includes structural and functional equivalents to these matters. It is understood that such equivalents include not only the currently disclosed equivalents but also equivalents which will be developed in the future, that is, all elements which are invented so as to perform the same function regardless of the structure.

Therefore, for example, the block diagram of this specification is understood to represent an illustrative conceptual aspect which specifies the principle of the invention. Similarly, it is understood that all of a flowchart, a status transitional view, and a pseudo code are substantially represented in a computer readable medium and indicate various processes executed by a computer or a processor regardless of whether a computer or a processor is apparently illustrated.

Functions of various elements illustrated in the drawings including a functional block which is represented by a processor or a similar concept may be provided by using not only an exclusive hardware but also a hardware which may execute software with regard to appropriate software. If the function is provided by the processor, the function may be provided by a single exclusive processor, a single shared processor or a plurality of individual processors and some of them may be shared.

A precise usage of a processor, control or a terminology suggested as a similar concept thereto cannot be interpreted by exclusively citing hardware which is capable of executing software but should be understood to implicatively include a digital signal processor (DSP), a ROM, a RAM, and a non-volatile memory which store hardware and software without any restrictions. Well known and commonly used other hardware may be included thereto.

In the claims of this specification, components represented as means to perform the function described in the detailed description, for example, is intended to include a combination of circuit elements which perform the above-mentioned functions or all methods which perform functions including all types of software including a firmware/microcode and may be combined with an appropriate circuit which executes the software in order to perform the function. In the invention defined by the claims, the functions provided by the various described means are combined with each other and also combined with the method demanded by the claims so that any means which provides the above-mentioned function is understood to be equivalent as understood from the specification.

The above objects, features, and advantages will be more obvious from the following detailed description with reference to the accompanying drawings, and the technical spirit of the invention may be easily carried out by those skilled in the art. However, in describing the present invention, if it is considered that the detailed description of related known configuration or function may unnecessarily loud the gist of the present invention, the detailed description thereof will be omitted. Hereinafter, an exemplary embodiment of the present invention will be described in detail with reference to the accompanying drawings.

The present exemplary embodiment discloses a geographic information analyzing apparatus which allows a user to implement a framework which suggests easier resolution for analyzing and predicting geographic information and a method thereof. Such geographic information analyzing apparatus and method may integratively implement an equation which uses various geospatial attributes as input variable values (for example, a regression equation for predicting package pick-up and delivery times for a specific region in a delivery destination of a distribution center expressed by $y=f(X)$) with functions provided by system or a user-defined function in a geographic information system (also abbreviated as GIS) based environment. Only by setting an arbitrary region on the map, the user may easily analyze and predict the region and express the result on the GIS environment based map.

In the related art, when an arbitrary region which is randomly selected in the GIS environment is specifically analyzed and predicted using various information stored in a data storing unit, the data of the database is carried out to the outside to perform specific analysis to be performed by the user and the result value is stored in the database again to check the result value through the user interface, which is so complicated.

According to the geographic information analyzing apparatus and the method thereof according to the present exemplary embodiment, an equation of a model for analysis and prediction which is built by the user is integratively implemented in a user-defined function in the database and even though any arbitrary region is set based thereon, the function in which the equation is integratively implemented is promptly called so as to perform analysis or prediction represented by the equation. Changes in information on a border of a specific region or building and roads/streets and various geology environmental attributes, and various attribute information such as population, housing, and income are reflected so as to promptly and conveniently perform new analysis and prediction. The user can perform the analysis and prediction of an arbitrary region only by setting the arbitrary region on the map.

Hereinafter, a geographic information analyzing apparatus and a method thereof disclosed in the exemplary embodiment will be described in detail with reference to the drawings.

FIG. 1 is a view illustrating a geographic information analyzing apparatus according to an exemplary embodiment.

Referring to FIG. 1, the geographic information analyzing apparatus 100 includes a data storing unit 120 which includes a spatial data storing unit 121 which stores geospatial information and an attribute data storing unit 123 which stores attribute information corresponding to the spatial data, a map viewer 111 which provides a user interface and receives spatial information of an arbitrary region from a user, and a function providing unit 130 which compares the geospatial information with the spatial information of the arbitrary region to calculate an overlapping ratio and performs analysis in accordance with a previously set function using attribute information in accordance with the overlapping ratio. The attribute data storing unit 123 includes an equation storing unit 124 which stores an equation of a function which is set in advance, and an input variable storing unit 125 which stores an input variable of the equation. The input variable storing unit 125 stores an input variable of the equation based on extracted attribute information. Here, the function which is set in advance may include a function which is specified by the user. The data storing unit 120 and the function providing unit 130 may be included together in the spatial database 140.

The spatial data storing unit 121 may store the spatial data which is the geospatial information and the attribute data storing unit 123 may be configured by non-spatial data excluding the spatial data which is geospatial information. The geospatial information may be geospatial information determined based on border information in accordance with criteria which is set in advance. That is, the geospatial information is information indicating various geographic space such as road/street, railroad, building, river, and bridge including border data of an administrative district such as a border of city and province, a border of city, county, and town, and a border of eup, myeon, and dong including a basic district border and a border of a counting zone for national statistical office and the attribute data may include a total, an average, and a percentage of population, housing, household, and business information corresponding to the geospatial information.

The attribute data storing unit 123 includes the equation storing unit 124 and the input variable storing unit 125. In the input variable storing unit 125, column names in a table which is used as input variables for the equation model and table names are stored.

The function providing unit 130 is configured by a user-defined function unit 131 which is set from the user in order to analyze a function for an arbitrary region. The function providing unit 130 may further include a system providing function unit 132. The user-defined function unit 131 of the function providing unit 130 includes a model executing function unit 133 which compares the geospatial information with spatial information of the arbitrary region to calculate an overlapping ratio and extracts attribute information in accordance with the overlapping ratio and an equation running function unit 134 which calls a previously set function and analyzes the function using the input variable stored in the input variable storing unit 125 based on the extracted attribute information. The function providing unit 130 implements and calls the equation stored in the equation storing unit 124 to perform analysis. The model executing function unit 133 compares the geospatial information with the spatial information of the arbitrary region to determine whether to totally overlap or partially overlap, extracts an input value required for the input variable of the equation, performs a necessary process for performing the entire model and returns the result value.

The map viewer 111 may be included in a function control unit 110 which controls the entire geographic information analyzing apparatus. The map viewer 111 creates one or more map layers by the stored map data to provide the map layer to the user through the user interface and receives an arbitrary region to be analyzed and predicted on the map layer using an equation of a model defined by the user. The spatial information of the arbitrary region input described above may be created to have a polygon shape.

More specifically, if the spatial information (geometry) of the arbitrary region is received by the map viewer 111, it is determined whether to overlap. To determine whether to overlap, it is checked whether the geographic information of a feature for the arbitrary region overlaps a feature which forms the map layer and the determination of whether to overlap includes determination of whether the feature of the map layer is completely contained in the arbitrary region or partially overlaps the arbitrary region. With respect to the feature which is determined to overlap, the overlapping ratio is calculated and an ID of the overlapping feature and the overlapping ratio are stored in a new overlapping feature list table in the attribute data storing unit 123. The input variable which will be used as an input value of the equation with respect to the overlapping features is stored in the input variable storing unit 125 and a column value of the table of all input variables which are present in the list of the input variables is reflected as much as the overlapping ratio stored in the overlapping feature list table. In order to use the attribute value which is reflected as much as the overlapping ratio as the input variable of the equation, the attribute values are transmitted as parameters of the equation running function unit to call the function and a result value calculated by the equation using the input variable values is returned to the model executing function unit, and the model executing function unit transmits the result value to the user through the user interface, again.

By doing this, the user may implement the equation which is created for analysis and prediction as a function in the data storing unit 200 so that by simply setting an arbitrary region in the GIS environment, it is possible to easily predict and analyze the region.

Figure 2:
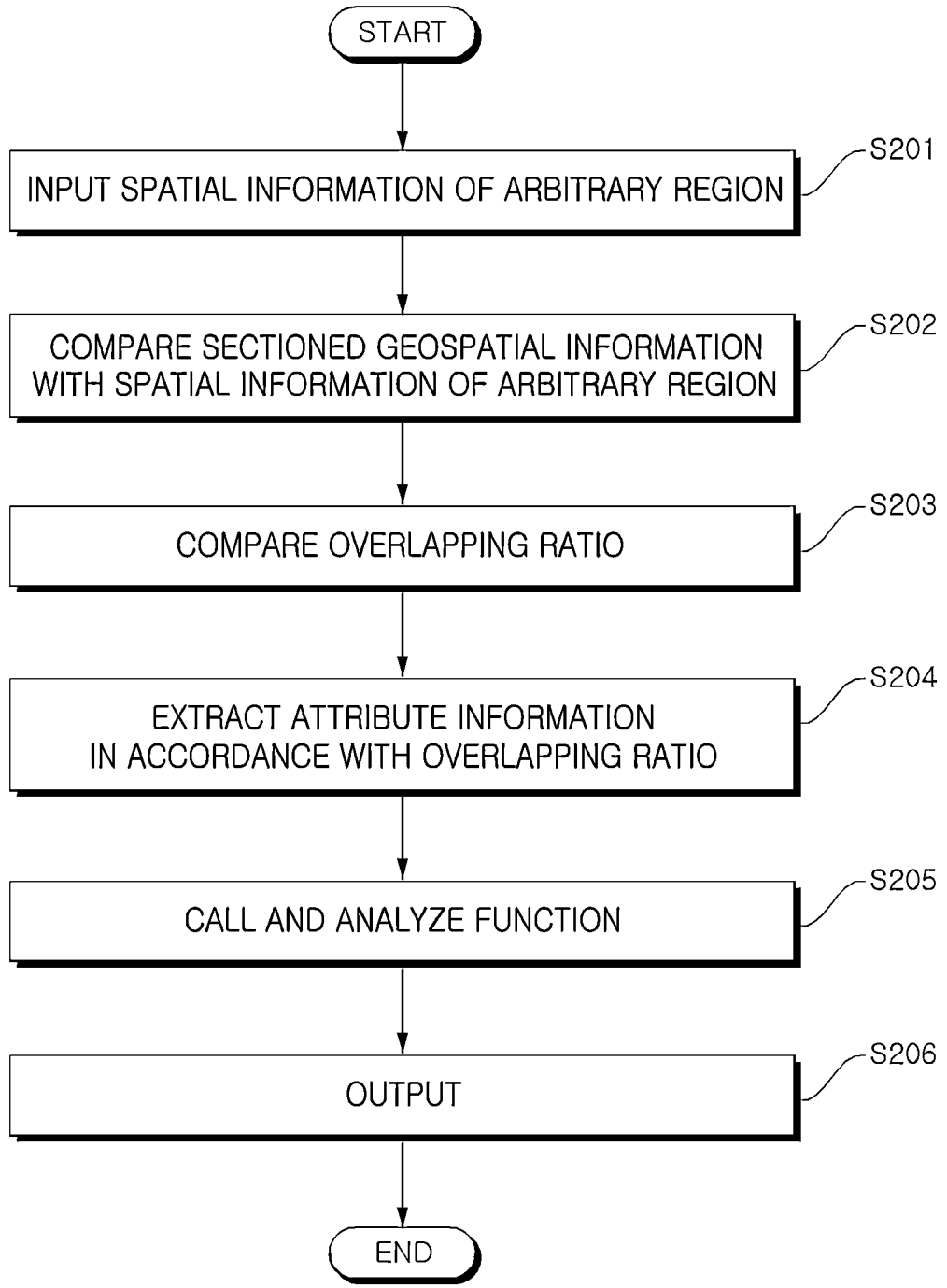
FIG. 2 is a view illustrating a geographic information analyzing method according to an exemplary embodiment.

FIG. 2 is a view illustrating a geographic information analyzing method according to an exemplary embodiment.

Referring to FIG. 2, a geographic information analyzing method of a geographic information analyzing apparatus including a data storing unit which includes a spatial data storing unit which stores geospatial information and an attribute data storing unit which stores attribute information corresponding to the spatial data includes providing a user interface and receiving spatial information of an arbitrary region from a user (S201), and comparing the geospatial information with the spatial information of the arbitrary region (S202) to calculate an overlapping ratio (S203) and using attribute information in accordance with the overlapping ratio (S204) to perform analysis in accordance with a previously set function (S205). The performed analysis result is output to the user (S206). Here, the geospatial information may be information determined based on border information in accordance with criteria which is set in advance.

The attribute data storing unit may include an equation storing unit which stores an equation of a function which is set in advance and an input variable storing unit which stores an input variable of the equation. The input variable storing unit may store the input variable of the equation based on extracted attribute information.

Here, the performing step may include comparing the geospatial information with spatial information of the arbitrary region (S202) to calculate an overlapping ratio (S203), extracting attribute information in accordance with the overlapping ratio (S204), and calling a previously set function and analyzes the arbitrary region using the input variable stored in the input variable storing unit based on the extracted attribute information (S205). The extracting step compares the geospatial information with the spatial information of the arbitrary region to determine whether to totally overlap or partially overlap.

The spatial information of the arbitrary region may be created to have a polygon shape and the function which is set in advance may include a function specified by the user.

In the specific description of other geographic information analyzing method, a repeated portion with the geographic information analyzing apparatus described with reference to FIG. 1 will be omitted.

Hereinafter, a specific exemplary embodiment which implements the geographic information analyzing apparatus and method will be described in detail with reference to FIG. 1.

A total implementing framework builds a data storing unit 120 for an analysis and prediction model, implements a user-defined function using an equation of the model and input variables, and implements an connected interface with a map viewer (GIS user interface) 111 using an API for the function.

First, a process of building the data storing unit 120 will be described.

The data storing unit 120 is formed of K tables. A set of these tables $T=\{t_i | i=1, 2, \ldots, K\}$ is configured by several table columns. Each table $t_i$=<table_name, column_size> which is present in the table set T is represented by the table name and the number of columns. The column $c_{ij}$ of the table refers to a j-th column in table $t_i$.

1. Analysis and Prediction Model Storing in Attribute data storing unit 123

The analysis and prediction model is stored in the attribute data storing unit 123 rather than spatial information in the data storing unit 120. Various equations which are created by the user are stored in the equation storing unit 124 of the attribute data storing unit 123. For example, if it is assumed that the user builds a model called as a regression equation $y=f(X)$ which calculates a prediction value for an arbitrary region on the geospatial region, the equation $f(X)$ of the model is stored in the equation storing unit 124 and the equation storing unit 124 may be formed of the table of [Table 1]

TABLE 1

| id | equation | equation4function | description |
|---|---|---|---|
| 1 | $y = \dfrac{3.5x_1^3}{2.5} \times 7x_2^2 - 0.5x_3 + 0.78$ | ((3.5 * ($1)³)/2.5) * 7 * $2 − 0.5 * $3 + 0.78 | Working time prediction eq. |
| 2 | $y = ax_1^2 + bx_2 + c$ | a * ($1)² + b * $2 + c | Working load prediction eq. |
| ... ... | ... | ... | ... |

2. Input Variable Storing Unit 125 of Equation

Columns which are used as input variables of the equation for a model stored by the user are stored in the input variable storing unit 125. An input variable set $X=\{x_{ij} | i=1, 2, \ldots, K$ and $j<=t_i$·column_size$\}$ used as an input value of the equation is mapped to the column of the table one to one. Accordingly, the input variable $x_{ij}$ of the model equation is the same as $c_{ij}$ and the input variable set X is stored using a table name of INPUT_VAR.

A process of implementing to store an input variable is as follows.

```
FOR (int j = 1; j <= t_i.column_size; i++) {
    INSERT INTO INPUT_VAR (equation_id, table_name,
        column_name) VALUES (equation_id, t_i.table_name, c_ij);
    // for all i
}
```

The columns which are used as the input variable of the equation store the equation ID (equation_id), a table name (table_name) of a table in which a column to be used as an input variable is present, and a column name (column_name) in an INPUT_VAR table of in the input variable storing unit 125 with respect to all input variable sets X. An example of detailed configuration of the INPUT_VAR table is as following Table 2.

TABLE 2

| id[PK] | equation-id[FK] | table_name | column-name | description |
|---|---|---|---|---|
| 1 | 1 | table_1 | column_2 | ... |
| 2 | 1 | table_1 | column_4 | ... |
| 3 | 1 | table_2 | column_5 | ... |
| 4 | 2 | table_3 | column_1 | ... |
| ... | ... | ... | ... | ... |

It is known that the input variable set X which is used in Equation 1 (equation_id=1) has total three input variables of $\{x_{12}, x_{14},$ and $x_{25}\}$.

This may be obtained using the following query language.
SELECT table_name, column_name FROM INPUT_VAR WHERE equation_id=1;
The result thereof is as following Table 3.

TABLE 3

| table_name | column_name |
|---|---|
| table_1 | column_2 |
| table_1 | column_4 |
| table_2 | column_5 |

Next, a step of integratively implementing the equation in the user-defined function unit 131 includes a step of implementing the model executing function unit 133 and the equation running function unit 134 having geometry information for the region arbitrarily set in the map viewer 111 by the user as an input parameter.

The model executing function unit 133 includes a process of drawing the arbitrary region through the GIS user interface of the map viewer 111 by the user and a process of calculating the actual column value X' of the input variable set X of the equation before performing the actual equation running function. In this process, a process of extracting an arbitrary region from the map layer is required in order to analyze and predict the arbitrary region set by the user. Therefore, after selecting features which overlap the drawn arbitrary region, a process of extracting the drawn arbitrary region proceeds.

In Equation 1 for analysis and prediction, IDs (feature_id) of all features which overlap the geographic information which is transmitted as the parameter for all tables satisfying that equation_id=1 are extracted from table_name colume of INPUT_VAR table which is the input variable storing unit 125 and a ratio of the overlapping area is calculated to be stored in the overlapping feature list table T'.

An example of a query language which processes a query of extracting the overlapping feature is as follows.

```
SELECT feature_id, ratio FROM t_i WHERE
ST_INTERSECTS(g, t_i.geometry); // for all i
```

In the above example of the query language, the ratio may be calculated by the following method. Here, the overlapping ratio is generally used and may be calculated by different methods depending on the characteristic of the model or the user.

```
ratio = ST_AREA(ST_INTERSECTION(g, t_i.geometry)) /
ST_AREA(t_i.geometry); // if, geometry type is polygon
    ratio = ST_LENGTH(ST_INTERSECTION(g, t_i.geometry)) /
ST_LENGTH(t_i.geometry); // if, geometry type is line
    ratio = (COUNT (t_i.geometry) WHERE (ST_INTERSECTS(g,
t_i.geometry))) / COUNT(ti.geometry);// if, geometry type is
point
```

Figure 3:
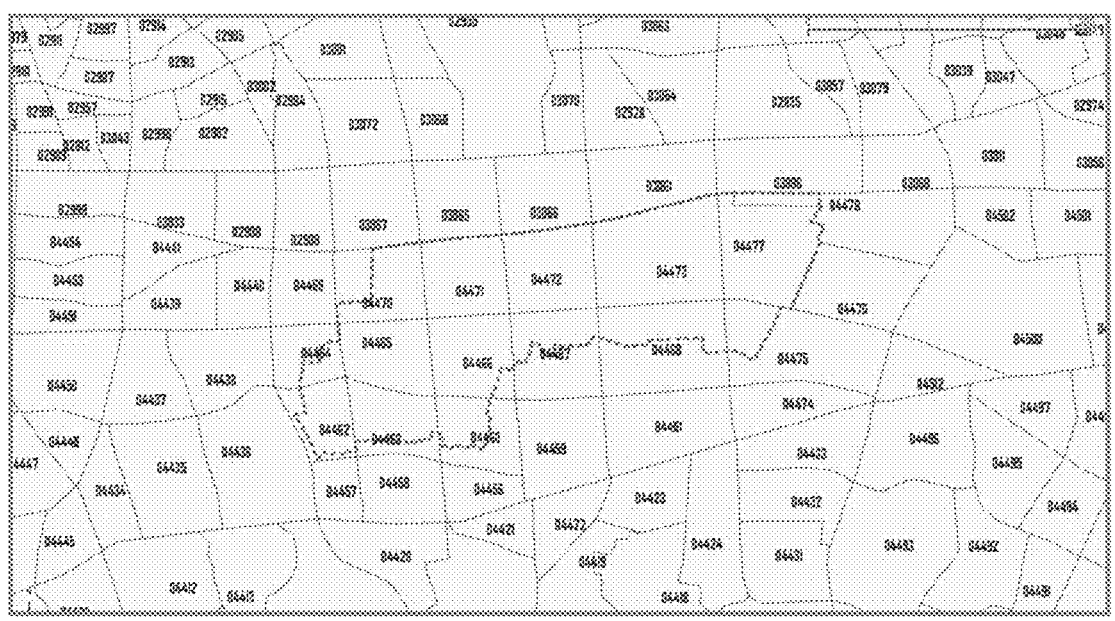
FIG. 3 is a view illustrating an example which calculates an overlapping ratio.

FIG. 3 is a view illustrating an example which calculates an overlapping ratio.

Referring to FIG. 3, it is known that $T'=\{t_1', t_2'\}$. In the table $ti'=<feature\_id, ratio>$ which is used as two map layers, the feature_id which is extracted using the query language and the calculated overlapping ratio are stored.

In the region which is arbitrarily drawn by the user in the map layer t1, total 15 features (04460, 04462, 04463, 04464, 04465, 04466, 04467, 04468, 04470, 04471, 04472, 04473, 04475, 04477, and 04478) overlap and an example of the calculated overlapping ratio is as following Table. ratio=1 means that the features of the map layer completely overlap the drawn arbitrary region.

A result of the query language of FIG. 3 is as the following Table 4.

TABLE 4

| id | feature_id | ratio |
|---|---|---|
| 1 | 04460 | 0.42 |
| 2 | 04462 | 0.85 |
| 3 | 04463 | 0.79 |
| 4 | 04464 | 0.32 |
| 5 | 04465 | 1.00 |
| 6 | 04466 | 0.90 |
| ... | ... | ... |

In the above-mentioned example, if it is assumed that an attribute of a total population among the attributes of the overlapping features is used as an input variable of the equation, all populations of the features need to be extracted and added. However, it is known that 10 features (04460, 04462, 04463, 04464, 04466, 04467, 04468, 04470, 04475, and 04478) out of 15 overlapping feature lists do not completely overlap. In this case, for ten partially overlapping features, a ratio of overlapping portions needs to be calculated and reflected. In this case, the ratio may be calculated by the above-mentioned ratio calculating method or a method which is determined by the user.

A process of reflecting the calculated ratio into the attribute values of 15 features extracted from the column which is used as the input variable set $X=\{x_{12}, x_{14}, x_{25}\}$ of Equation 1 of the above example is required.

An example of a query language of reflecting the ratio is as follows.

```
x_ij = SELECT SUM([c_ij] * ratio) FROM t_i, t_i' WHERE
t_i.feature_id = t_i'.feature_id;
```

The ratio (in T') needs to be reflected into all $x_{ij}=c_{ij}=\{x_{12}, x_{14}, x_{25}\}$ in the input variable set X for 15 features which are present in the overlapping feature list. Next, the respective $x_{ij}$ are added to obtain a final input value for one overlapping feature. An example of the result of the query language is as following Table 5.

TABLE 5

| x12 | x14 | x25 |
|---|---|---|
| sum(x12); for all features | sum(x14) for all features | sum(x25) for all features |

The three input variable value sets X' which are obtained as a result of the query language are transmitted as the parameter of the equation running function which is the next process to be analyzed and predicted in accordance with the equation of $y=f(X)$ which is implemented in advance and the final result value is returned.

A final step is a step of implementing the equation for analysis and prediction in the user-defined function providing unit 131 of the spatial database 140. It will be described in detail that one example equation of $y=f(X)$ of the above exemplary embodiment is implemented using the model executing function unit 133 and the equation running function unit 134.

First, if the user wants to predict an arbitrary region using the above regression equation, the user draws the arbitrary region on the map, transmits geometry information for the drawn arbitrary region as the parameter to call the model executing function 133. The called function extracts the overlapping feature list from the map layer and calculates a ratio of the overlapping region. The input variable value set X' of the equation calculated by the calculating process and the geometry information for the drawn arbitrary region are transmitted as the parameter to call the equation running function 134.

An example of the model executing function (executeModel( )) is as follows.

```
return_type executeModel(geometry g){
    // 1. Extract feature (feature_id) overlapping geometry.
    // 2. Calculate overlapping ratio of extracted overlapping
    features.
    // 3. Store the values obtained in the above processes 1 and
    2 in overlapping feature list T'.
    T' = SELECT feature_id, ratio FROM t_i WHERE
    ST_INTERSECTS(g, t_i.geometry); for all i
    // 4. Reflect the above obtained ratio into all x_ij (=c_ij) of
    equation input variable list X and extract reflected value to
    be stored in X'.
    X' = x_ij' = SELECT SUM([c_ij] * t_i'.ratio) FROM t_i, t_i'
    WHERE t_i.feature_id = t_i'.feature_id;
    // 5. After calling function runEquation(record X') which
    transmits drawn geometry g and X' in which attribute values
    corresponding to g are stored as the parameter to execute
    regression equation, return result value of runEquation( )
    function to return to executemodel( ) function.
    return runEquation(X');
}
```

The equation $y=f(X)$ of the above exemplary embodiment is implemented inside the called equation running function (runEquation( )). Next, the result value calculated by the equation is returned to the function model executing function (executeModel( )) and then transmitted to the map viewer 111 again so as to be simply viewed through the screen to the user.

An example of implementation of the equation running function (runEquation( )) is as follows.

```
return_type runEquation (record X'){
    // 1. Allocate each variable value of the transmitted
    parameter X'={x_i|i=1, 2, ..., I} to the input variable X of the
    equation y=f(X). Here, an index of the parameter X' which
    has a form of a record is denoted by $ and $2 means a second
    value of the record.
    x1 = $1;
    x2 = $2;
    ...
    xI = $I;
    // 2. Implement Equation
    equation = SELECT equation4function FROM EQUATIONS
    WHERE id = 1;
    result = run equation;
    // 3. Return result value calculated through equation
    return result;
}
```

According to the geographic information analyzing apparatus and the method thereof according to the exemplary embodiment, when an arbitrary region on a geospatial environment is expanded or reduced or various components in the region are changed, it is possible to provide a series of built frameworks which allow a user to immediately check the result value obtained through the analysis and prediction model which is implemented in advance on the user interface using the user-defined function only by simply setting the arbitrary region which may be changed using the GIS tool by a user. That is, the equation for the model which is established by the user for the analysis and prediction is integratively implemented with the user-defined function in the database so as to conveniently perform the analysis and prediction in the GIS environment and systematically and integratively implement the user-defined function between the GIS based user interface, the data storing unit, and the analysis and prediction model through the API. Therefore, the user conveniently draws an arbitrary region on which specific analysis and the prediction will be performed through the GIS based user interface to call the user-defined function implemented in the data storing unit to analyze and predict a desired region. A process of extracting a space of the set arbitrary region which overlaps several background map layers, querying and collecting various attribute information corresponding to the overlapping space, and allocating the collected attribute values to the input variable as an input value of the equation and a process of executing the equation and transmitting the result value calculated as the performed result to the user again are implemented in the (user-defined) function and thus simple analysis and prediction are possible without requiring a separate external analysis process. Even though the equation of the model is modified or changed, only the equation storing unit of the model is independently corrected to be used without changing the entire system framework. Even though various different analysis and prediction models are input to the equation storing unit, the region is set through the user interface so that the framework which wants to calculate the region may be utilized in various methods.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A geographic information analyzing apparatus employing a processor, comprising:
    a data storing unit which includes
        a spatial data storing unit configured to store geospatial information, which is information determined based on border information in accordance with criteria which is set in advance;
        an attribute data storing unit configured to store attribute information corresponding to the spatial data;
        an equation storing unit configured to store an equation of the previously set function; and
        an input variable storing unit configured to store an input variable of the equation
    a map viewer which provides a user interface and receives spatial information of an arbitrary region from a user, and
    a function providing unit configured to compare using the processor the geospatial information with the spatial information of the arbitrary region to calculate an overlapping ratio and performs analysis in accordance with a previously set function using attribute information in accordance with the overlapping ratio,
    wherein the arbitrary region is a part of geographic space corresponding to the geospatial information.

2. The apparatus of claim 1, wherein the input variable storing unit stores the input variable of the equation based on the extracted attribute information.

3. The apparatus of claim 2, wherein the function providing unit includes:
    a model executing function unit configured to compare the geospatial information with the spatial information of the arbitrary region to calculate an overlapping ratio and extracts attribute information in accordance with the overlapping ratio; and
    an equation running function unit configured to call the previously set function and analyzes the function using the input variable stored in the input variable storing unit based on the extracted attribute information.

4. The apparatus of claim 3, wherein the model executing function unit compares the geospatial information with the spatial information of the arbitrary region to determine whether to completely overlap or partially overlap.

5. The apparatus of claim 4, wherein the spatial information of the arbitrary region is generated in the form of a polygon.

6. The apparatus of claim 5, wherein the previously set function includes a function designated by the user.

7. A geographic information analyzing method of a geographic information analyzing apparatus including a data storing unit which includes a spatial data storing unit configured to store geospatial information and an attribute data storing unit configured to store attribute information corresponding to the spatial data, wherein the attribute data storing unit includes:
  an equation storing unit configured to store an equation of the previously set function; and
  an input variable storing unit configured to store an input variable of the equation,
the method comprising:
  providing a user interface and receiving spatial information of an arbitrary region from a user, and
  comparing the geospatial information with the spatial information of the arbitrary region to calculate an overlapping ratio and performing analysis in accordance with a previously set function using attribute information in accordance with the overlapping ratio,
  wherein the arbitrary region is a part of geographic space corresponding to the geospatial information.

8. The method of claim 7, wherein the input variable storing unit stores the input variable of the equation based on the extracted attribute information.

9. The method of claim 8, wherein the executing includes:
  comparing the geospatial information with the spatial information of the arbitrary region to calculate an overlapping ratio and extracting attribute information in accordance with the overlapping ratio; and
  calling the previously set function and analyzing the function using the input variable stored in the input variable storing unit based on the extracted attribute information.

10. The method of claim 9, wherein the extracting compares the geospatial information with the spatial information of the arbitrary region to determine whether to completely overlap or partially overlap.

11. The method of claim 10, wherein the spatial information of the arbitrary region is generated in the form of a polygon.

12. The method of claim 11, wherein the previously set function includes a function designated by the user.

\* \* \* \* \*